April 5, 1927.  E. H. L. ENGLUND  1,623,400
TRICYCLE
Filed Aug. 3, 1925  2 Sheets-Sheet 2
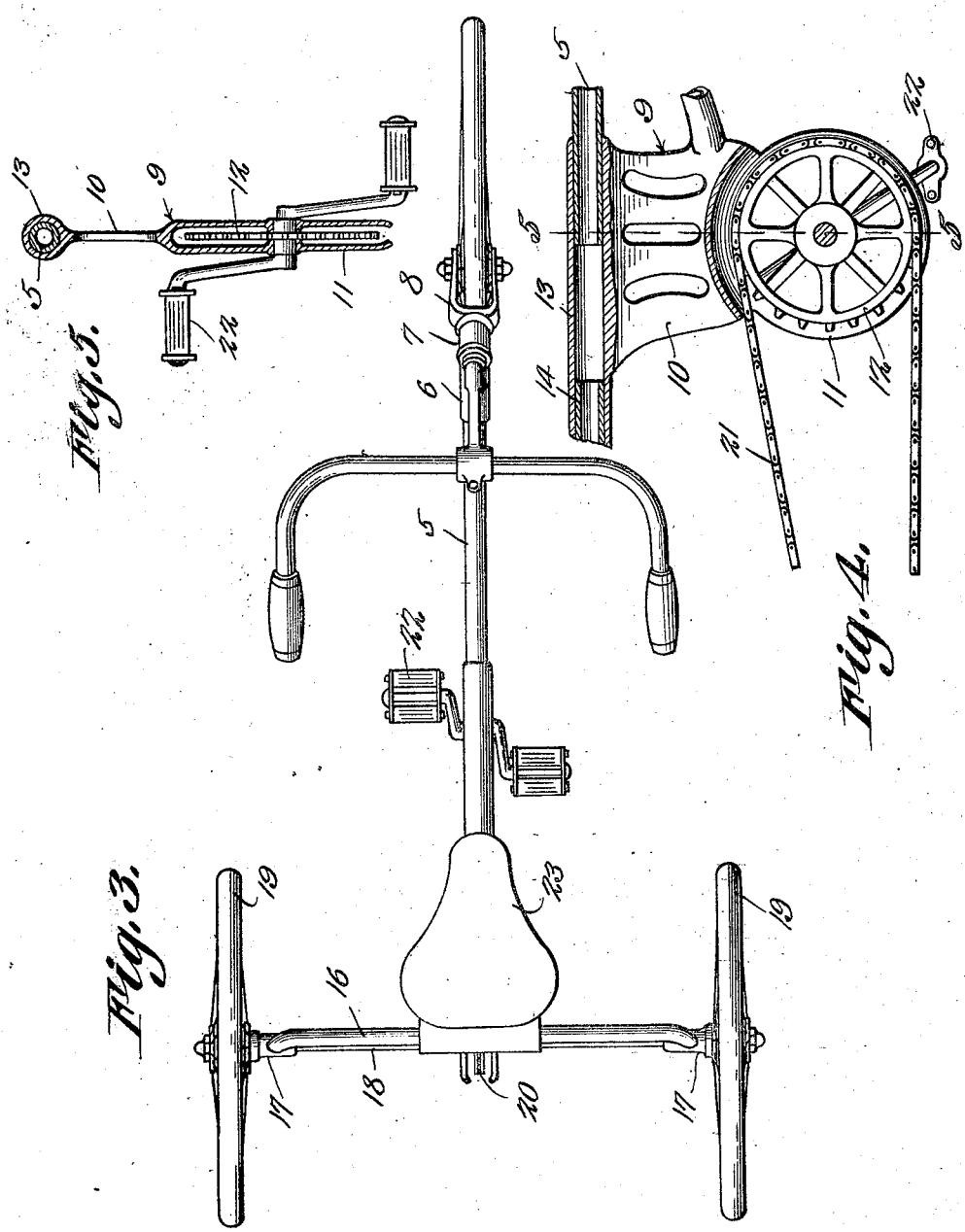
Inventor
E. H. L. Englund
By C. A. Snow & Co.
Attorneys Patented Apr. 5, 1927.

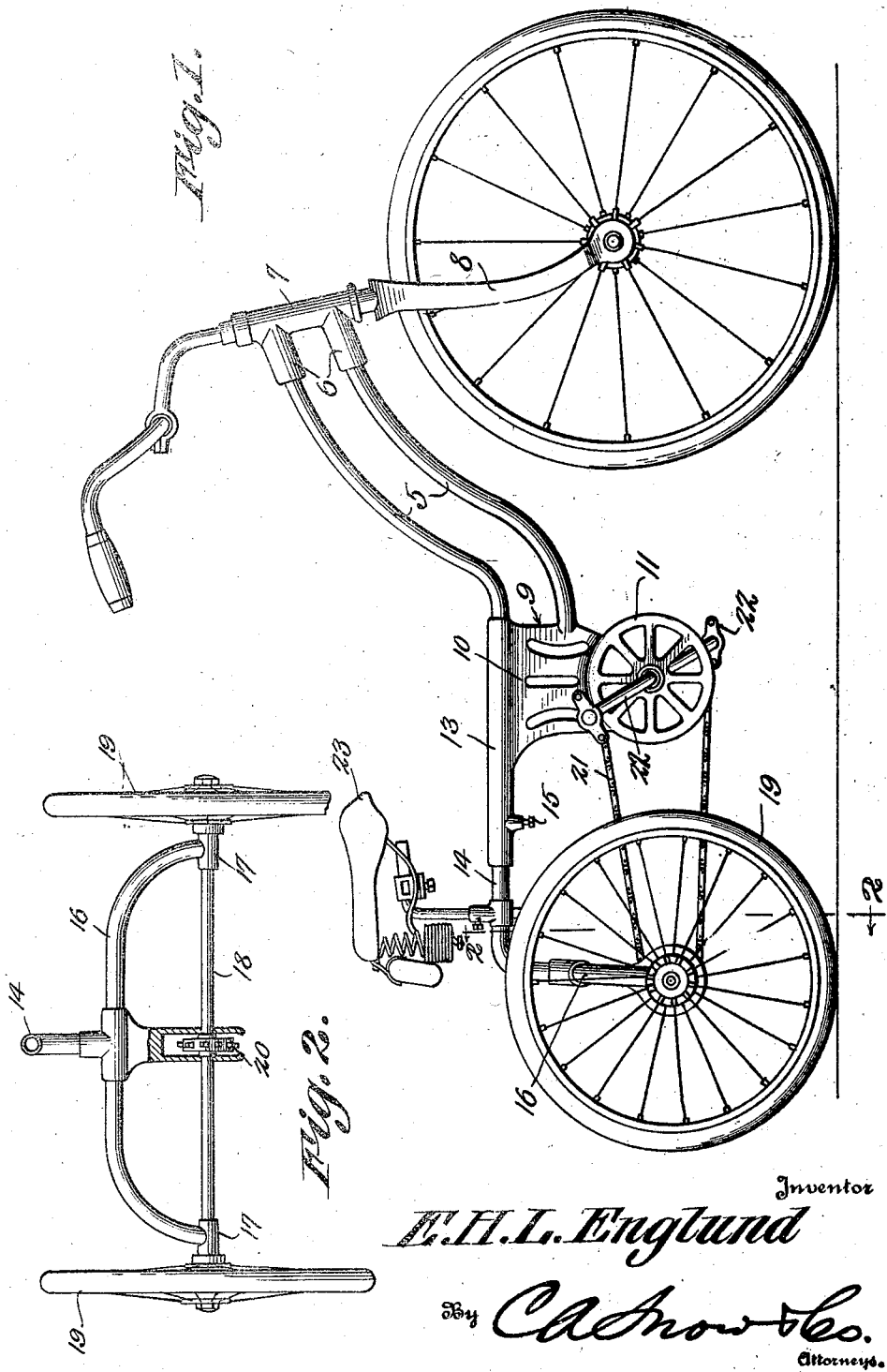

1,623,400

UNITED STATES PATENT OFFICE.

EDWIN H. L. ENGLUND, OF MUSKEGON HEIGHTS, MICHIGAN, ASSIGNOR OF ONE-THIRD TO SOPHUS M. PETERSON AND ONE-THIRD TO HANS M. PETERSON, BOTH OF MUSKEGON HEIGHTS, MICHIGAN.

TRICYCLE.

Application filed August 3, 1925. Serial No. 47,954.

The present invention has reference to tricycle construction, the primary object of the invention being to provide a combined bearing and guard for supporting the main sprocket wheel of the power transmitting mechanism thereof.

Another important object of the invention is to provide a novel frame construction which may be adjusted in such a manner as to permit the rear wheels of the tricycle to be moved towards or away from the front or steering wheel of the tricycle.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is a side elevational view of a tricycle constructed in accordance with the invention.

Figure 2 is a sectional view taken on line 2—2 of Figure 1.

Figure 3 is a plan view of a tricycle.

Figure 4 is a fragmental sectional view illustrating the combined bearing and guard for the main sprocket wheel.

Figure 5 is a sectional view taken on line 5—5 of Figure 4.

Referring to the drawings in detail, the reference character 5 indicates curved bars forming the main or body portion of the frame of the tricycle, which bars have their upper ends secured within the pipes 6 that are formed integral with the head 7 of the frame in which the fork 8 is pivotally mounted.

The reference character 9 indicates a combined guard and bearing, and as shown, the guard includes a body portion 10 having a depending portion 11 circular in formation and adapted to substantially house the sprocket wheel 12 which is of a diameter less than the diameter of the depending portion 11. Forming a part of the guard is a tubular member 13 in which the bar 14 is positioned, the connection between the tubular member 13 and bar 14 being such as to permit the bar 14 to be adjusted with respect to the tubular member 13, there being provided a set screw 15 for engaging the bar 14 and holding the bar 14 in its positions of adjustment.

The bar 14 curves downwardly and has connection with the bar 16 that has bearings 17 mounted at the ends thereof, the bearings being designed to accommodate the rear axle 18 on which the rear wheels 19 of the tricycle are mounted.

Mounted on the axle 18 is a sprocket wheel 20 over which the chain 21 moves, which chain also moves over the sprocket wheel 12 that is actuated by the pedals 22 in the usual and well known manner.

The reference character 23 indicates the seat of the tricycle, which may be of any convenient construction and adjustable so that persons of various sizes may ride on the tricycle with comfort.

From the foregoing it will be obvious that due to this construction, the main sprocket wheel 12 of the device is substantially housed by the bearing member, thereby eliminating any possibility of persons riding on the tricycle, having their clothes caught in the sprocket wheel which would probably result in injury to the person.

I claim:—

In a tricycle, a frame including a front section and a rear section, vertically spaced bars forming a part of the front section, a guard having a tubular member, forming a part of the front section, said rear section embodying a curved axle supporting bar, a bar extending upwardly from the curved axle supporting bar and extending into the tubular member to adjustably connect the front and rear sections, wheels mounted on the axle, a fork mounted in the forward section, an axle mounted in the fork, and a wheel mounted on the axle of the fork.

In testimony that I claim the foregoing as my own, I have hereto affixed my signature.

EDWIN H. L. ENGLUND.